(No Model.)

A. FARMER.
SUSPENSION SCALE.

No. 533,450. Patented Feb. 5, 1895.

Witnesses:
R. J. Jacker.
D. C. Henshaw.

Inventor:
Arcidas Farmer
By Louis K. Gillson
Atty.

UNITED STATES PATENT OFFICE.

ARCIDAS FARMER, OF CHICAGO, ILLINOIS.

SUSPENSION-SCALE.

SPECIFICATION forming part of Letters Patent No. 533,450, dated February 5, 1895.

Application filed October 24, 1894. Serial No. 526,805. (No model.)

*To all whom it may concern:*

Be it known that I, ARCIDAS FARMER, a citizen of the United States, residing at Chicago, in the county of Cook and State of Illinois, have invented certain new and useful Improvements in Suspension-Scales; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to that class of suspension scales in which weighted levers are used to counter-balance the object to be weighed, and its object is to provide improved means for actuating the indicating hand or pointer.

The invention consists of a pair of weighted levers, secured to hubs adapted to be turned or rocked by the strain upon the tray and more particularly to the means for connecting these hubs with the arbor or spindle carrying the indicating pointer, so that the latter shall be accurately thrown and positively retracted.

Figure 1:
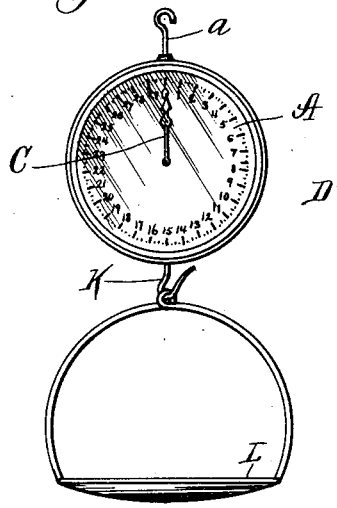
Figure 2:
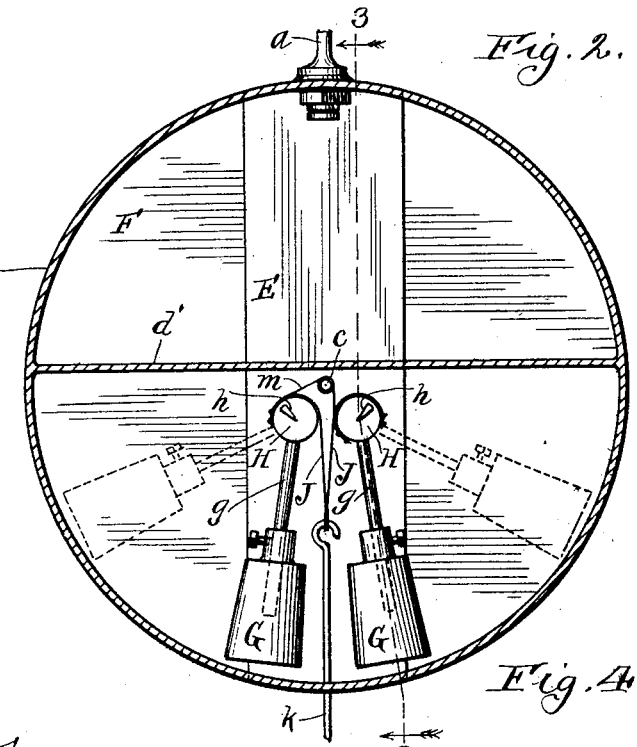
Figure 3:
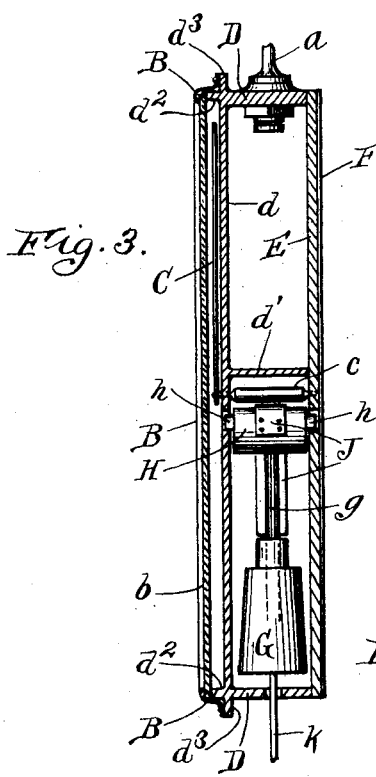
Figures 4, 5:
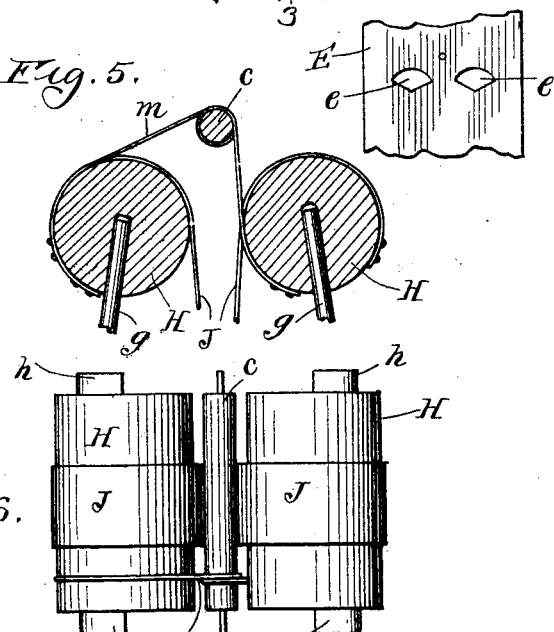
Figure 6:
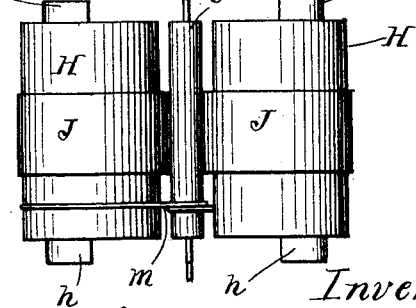

In the drawings I show at, Figure 1, an elevation of my scale. Fig. 2, is a longitudinal vertical section of the body of the scale, the face being removed. Fig. 3, is a transverse vertical section on the line 3—3 of Fig. 2. Fig. 4, is a detail showing the bearings for the hubs. Fig. 5, is a transverse section through the hubs and spindle of the pointer. Fig. 6, is a plan view of the spindle and the hubs.

The graduated scale A, in dial form is used in conjunction with a pointer C, mounted upon a spindle and adapted to swing over the scale in the same manner as the ordinary butchers' spring balance scale. This graduate scale is mounted upon the face $d$, of a circular case D, adapted to inclose the operating mechanism. An annular flange $d^2$ projects from the face $d$, of the case so as to inclose the scale A, and to receive a ring B, which secures a glass front $b$, in position over the scale, whereby space is left between the scale and the glass plate for the pointer C. A radial flange $d^3$, upon the case D, and in the same plane substantially as the face $d$, of the case, serves as a stop for the ring B.

The case D, is provided with a transverse partition $d'$, and at its rearward side with a vertical bar or plate E, securely attached to the case in any desired manner. The back of the case may be closed with an ordinary sheet metal cap F.

I use two weights G, of equal size and mount them adjustably upon arms $g$, secured in the hubs H. These hubs are provided with knife edge gudgeons $h$, which are journaled in suitable apertures $e$, in the bar E, and in corresponding apertures in the face $d$, of the case D.

Flexible bands J, of any desired material, preferably rawhide, are secured to the hubs H, and passing over them depend between them. The shank $k$, of the hook K, is secured to the lower end of the bands J, and fits loosely within a suitable aperture in the lower side of the case D. The tray L, of the scale is suspended from the hook K.

The spindle $c$, which carries the hand or pointer C, is journaled in the bar E, and in the face $d$, of the case. A flexible band $m$, of any desired material is wound upon the spindle $c$, a sufficient number of turns to prevent it from slipping and its ends are secured to the hubs H, H, passing under one and over the other so that as the weights swing apart the spindle is caused to rotate and the pointer C, to play over the graduated scale A.

Any object placed upon the tray L, will cause the weights G, G, to swing apart and as the weights are raised their leverage increases. The partition $d'$, serves as a stop to limit the upward movement of the weights. The weights are vertically adjustable upon the arms $g$, for the purpose of regulation.

I have shown the preferred form of construction but do not wish to be limited to the precise means shown for causing the spindle $c$, to rotate as the vertical movement of the tray may in a variety of well known ways be utilized in communicating a rotary motion to the spindle.

I prefer to use two weights rather than but one as they keep the entire instrument balanced.

I claim as my invention—

In a suspension scale the combination with a case having upon its face a graduated indicating scale, of swinging weights, hubs for carrying the weights and journaled in the walls of the case, bands wound upon and depending between the hubs, a tray suspended from the bands, a pointer adapted to move over the graduated scale, a spindle for carrying the pointer, and a cord wound upon the spindle and having its ends secured to the hubs in such manner that it passes under one hub and over the other.

In testimony whereof I affix my signature in presence of two witnesses.

ARCIDAS FARMER.

Witnesses:
E. E. BARTHOLOMEW,
SPENCER WARD.